C. H. KENRICK.
ALL WOOD STEERING WHEEL.
APPLICATION FILED OCT. 16, 1920.
1,434,616.
Patented Nov. 7, 1922.
2 SHEETS—SHEET 1.
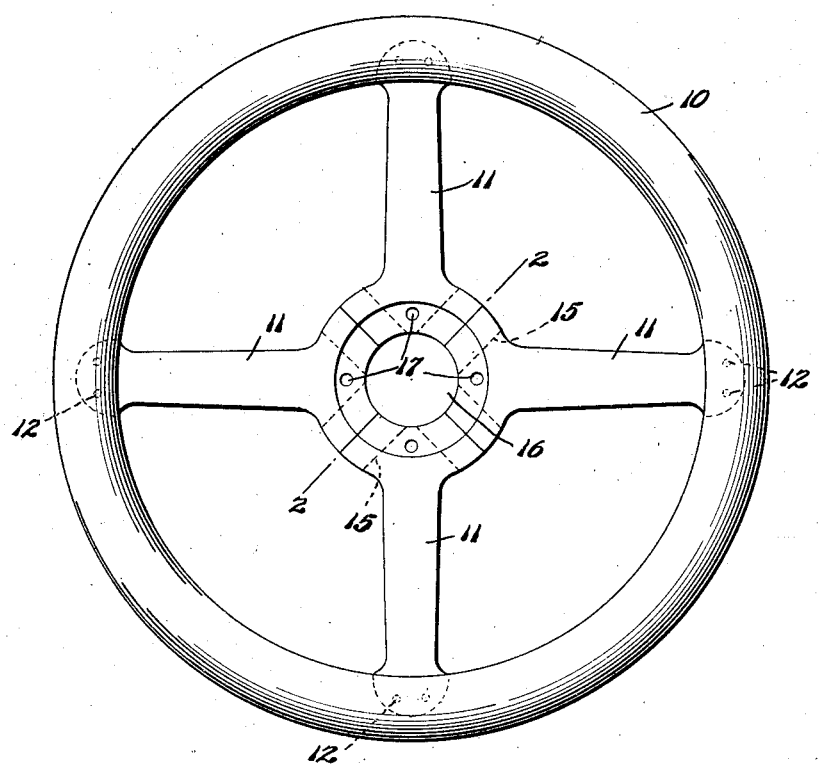
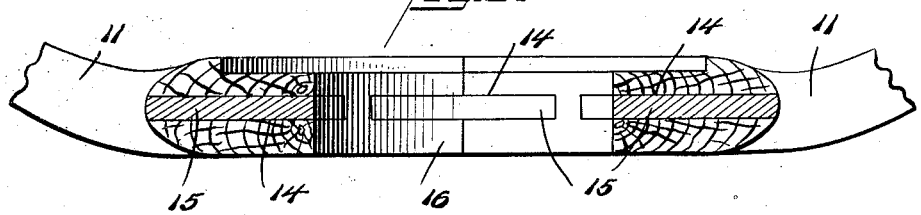

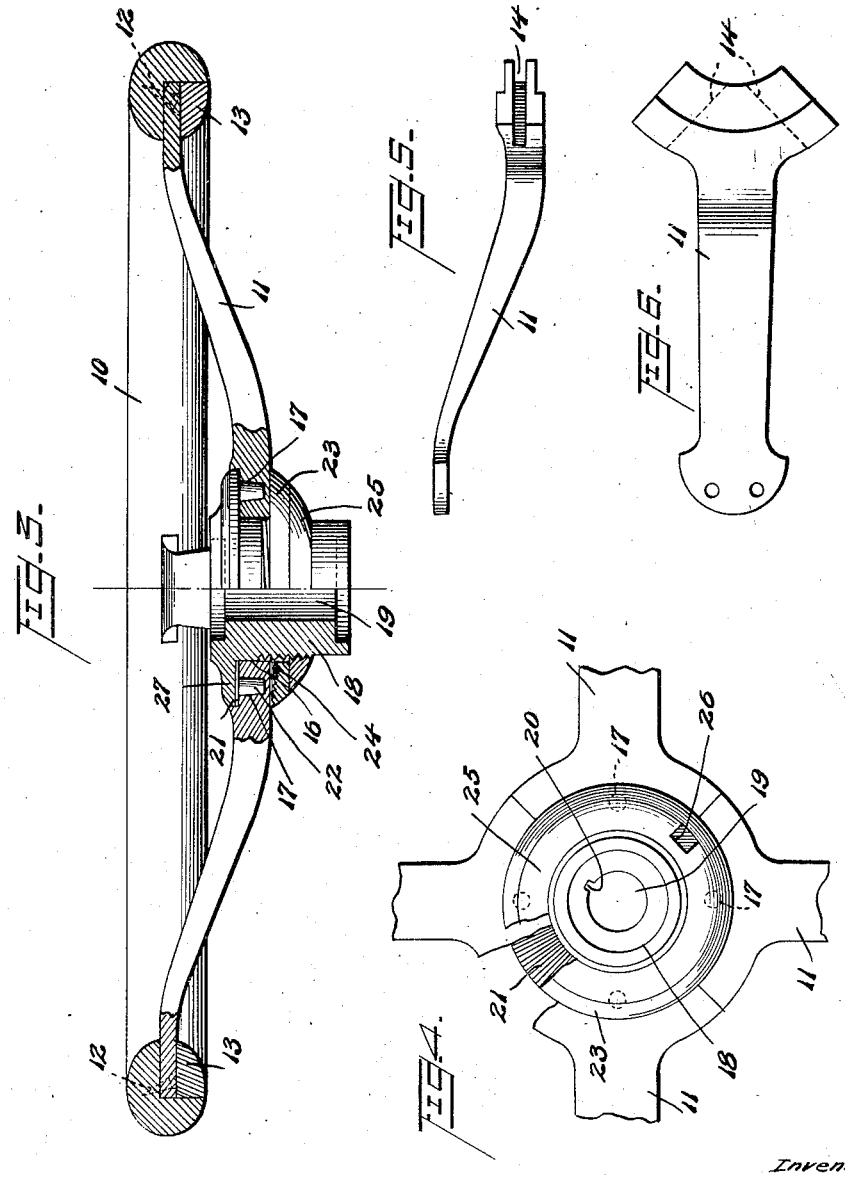

Patented Nov. 7, 1922.

1,434,616

UNITED STATES PATENT OFFICE.

CHARLES H. KENRICK, OF ONAWAY, MICHIGAN, ASSIGNOR TO THE AMERICAN WOOD RIM COMPANY, OF ONAWAY, MICHIGAN, A CORPORATION OF MICHIGAN.

ALL-WOOD STEERING WHEEL.

Application filed October 16, 1920. Serial No. 417,459.

*To all whom it may concern:*

Be it known that I, CHARLES H. KENRICK, a citizen of the United States, and residing at Onaway, county of Presque Isle, State of Michigan, have invented certain new and useful Improvements in All-Wood Steering Wheels, of which the following is a specification.

The present invention relates to steering wheels and particularly to steering wheels adapted for use on automobiles, airplanes and motor boats. The wheel is of the general type illustrated, described and claimed in the copending application of E. J. Lobdell, Serial No. 376,965, filed April 27, 1920, in which wooden spokes are provided instead of the usual metallic spokes, whereby a wheel of great strength is realized which has the advantages of lightness, superior appearance, greater cleanliness, and greater comfort to the user as compared with the usual wheel having the ordinary metal spokes. As is pointed out in the specification above mentioned steering wheels having iron or metal spokes must be frequently repainted to prevent rust forming to soil the hands of the user, inasmuch as the paint soon wears off under service conditions, whereas when wooden spokes are utilized the wood may be stained instead of painted and the color cannot be removed no matter how severe the usage. The appearance of the wooden spoke wheel is superior to that of the metal spoke wheel, the stained finish being attractive and the original grain of the wood being visible. Furthermore, as wood is a poor conductor of heat the operator's hands will not be rendered cold and numb in winter weather, which is often the case when metallic spokes are used and which interferes with the driver's control.

In the application just mentioned a metallic hub is provided for the steering wheel which hub is provided with radiating arms socketed to receive the inner ends of the spokes. While this is one manner of constructing the wheel which has proven satisfactory in practice, I have found that a lighter and stronger wheel may be made by enlarging the inner ends of the spokes and forming them substantially arch-shaped, providing means for firmly securing the inner ends of the spokes together to form a continuous hub, and providing a light metallic device, preferably of aluminum, for securing the steering wheel to a steering column. The exact design and arrangement of the spokes and the metallic securing means may be changed as desired and the invention is not limited in its scope to the exact embodiment disclosed in this application.

Figure 1 is a plan view of a steering wheel the metallic securing member being omitted;

Figure 2 is a section on the line 2—2 of Figure 1;

Figure 3 is an axial section through the steering wheel and showing the metallic securing means partially in section and partially in elevation;

Figure 4 is a bottom view of the hub portion of the wheel partly broken away;

Figure 5 is a side elevation of one of the spokes; and

Figure 6 is a plan view of the same.

The rim of the wheel is indicated at 10 and the four wooden spokes at 11 in the drawings. The outer ends of these spokes are fastened within the interior of the rim by screws 12 and the inserted blocks 13, this construction being fully described and illustrated in the copending application above mentioned and being an especially advantageous design inasmuch as it provides a rim which presents a practically unbroken gripping surface for the hands of the operator. The inner ends of the spokes are enlarged and are segmental in form, the ends of the individual segments abutting along radial planes, as clearly illustrated in Figure 1. The adjacent faces of the segmental enlargements are grooved or mortised as at 14 and inserted into each pair of adjacent mortises is a key 15 of wood the grain of which extends circumferentially of the hub to give the joint the greatest resistive force against breaking, in the operation of the wheel. The hub has an axial bore 16 to receive the member which secures it to the steering hub and has also a plurality of spaced recesses 17 one of which extends downwardly into each spoke at a point close to the bore 16 and lying along its central axis.

The wheel just described is light in weight, attractive in appearance, and of great strength, the construction whereby the inner ends of the spokes are joined together in the manner described giving a rigidity to the structure not realized where this formation of hub is not used.

A metallic sleeve 18, preferably of aluminum, having an internal axial bore 19 is adapted to fit around the steering column and has a keyway 20 to receive a suitable key by means of which it may be non-rotatably secured to the column. This sleeve has an external annular flange 27 at its upper end, which is provided on its under surface with a series of radially disposed downwardly projecting knife edges or ridges 21 and with four downwardly extending pins or lugs 22 adapted to fit within the recesses 17 in the upper side of the hub of the wheel. A clamping plate 23 in the form of an annular ring having a plurality of annular upwardly directed knife edges 24 fits loosely around the sleeve 18 and a nut 25 having threaded engagement with screw threads on the outer surface of the sleeve is provided for the purpose of raising and securing the clamping plate 23, a suitable opening 26 for a spanner being provided.

In assembling the wheel and its securing means the sleeve 19 is dropped through the bore 16 of the wooden hub with the pins 22 extending into recesses 17 and the clamping plate 23 and nut 25 placed in position on the lower side of the hub. By means of a wrench the nut 25 may then be rotated and the clamping plate 24 moved upward until the knife edges 21 are smashed into the upper surface of the hub and the knife edges 24 into the lower surface of the hub. The clamping action of the plate 24 and flange 27 tends to prevent relative rotation of the wheel and sleeve, the knife edges 21 and 24 which are mashed into the wood, and the pins 22 extending into recesses 17, all materially assisting in preventing this relative rotation so that the wheel is positively and firmly prevented from moving relatively to the sleeve which in turn will, of course, be secured firmly on the steering column.

Having thus described the invention what is claimed as new and desired to be secured by Letters Patent is:—

1. A steering wheel comprising a continuous self-sustaining rim of wood rounded in section, four wooden spokes of materially greater width than thickness entering and secured to said rim at their outer ends and each having symmetrical enlargements on opposite sides at its inner end on the lines of concentric circles the sides of the enlarged ends being in radial planes ninety degrees apart passing through the center of said circles beyond the inner end of the spoke and means for securing said enlarged inner ends together to form a continuous hub circular in outline.

2. A steering wheel comprising a continuous self-sustaining rim of wood rounded in section, four wooden spokes of materially greater width than thickness having flat parallel upper and lower faces at their ends and an intermediate part at a slight angle to these planes entering and secured to said rim at their outer ends and each having symmetrical enlargements on opposite sides at its inner end on the lines of concentric circles the sides of the enlarged ends being in radial planes ninety degrees apart passing through the center of said circles beyond the inner end of the spoke and means for securing said enlarged inner ends together to form a continuous hub circular in outline.

3. A steering wheel comprising a continuous self-sustaining rim of wood rounded in section, four wooden spokes of materially greater width than thickness entering and secured to said rim at their outer ends extending inwardly on radial lines and at an angle to the plane of the rim and each having symmetrical enlargements on opposite sides at its inner end on the lines of concentric circles the sides of the enlarged ends being in radial planes ninety degrees apart passing through the center of said circles beyond the inner end of the spoke and means for securing said enlarged inner ends together to form a continuous hub circular in outline.

4. A steering wheel comprising a continuous self-sustaining rim of wood having a surface curved in section a plurality of wooden spokes secured to said rim at their outer ends extending inwardly on radial lines and at an angle to the plane of the rim the said spokes having arc-shaped laterally enlarged inner ends the side surfaces being in radial planes those of one spoke abutting those of adjacent spokes and the upper and lower surfaces being in planes substantially parallel to the plane of the rim and means making contact with the upper and lower surfaces of said inner ends for clamping them together.

5. A steering wheel comprising a continuous self-sustaining rim of wood having a surface curved in section, a plurality of wooden spokes secured to said rim at their outer ends extending inwardly on radial lines, the said spokes having arc shaped inner ends laterally enlarged the sides surfaces of the enlarged portions abutting those of adjacent spokes forming a continuous hub with a cylindrical opening, a metal sleeve in said opening and means securing said inner ends together on said sleeve.

6. A steering wheel comprising a continuous self-sustaining rim of wood having a surface curved in section, a plurality of wooden spokes secured to said rim at their outer ends extending inwardly on radial lines and at an angle to the plane of the rim, the said spokes having arc shaped inner ends laterally enlarged the side surfaces of the enlarged portion abutting those of adjacent spokes forming a continuous hub with a cylindrical opening, a metal sleeve in said opening and means securing said inner ends together on said sleeve.

7. A steering wheel comprising a continuous self-sustaining rim of wood having a surface curved in section, a plurality of wooden spokes secured to said rim at their outer ends extending inwardly on radial lines and having much greater width than thickness, and having gradually decreasing thickness from the inner portion to the outer portion the said spokes having arc shaped inner ends laterally enlarged, the side surfaces of the enlarged portions being in radial planes and abutting those of adjacent spokes forming a continuous hub with a cylindrical opening, a metal sleeve in said opening and means securing said inner ends together on said sleeve.

8. A steering wheel comprising a continuous self-sustaining rim of wood curved in section, a plurality of wooden spokes secured to said rim at their outer ends extending inwardly on radial lines and having inner laterally enlarged arc shaped ends with abutting side surfaces forming a continuous hub portion with a central opening and means partly within said opening for engaging and holding said inner ends and adapted to secure the wheel to a steering post.

9. A steering wheel comprising a continuous self-sustaining rim of wood curved in section, a plurality of wooden spokes of much greater width than thickness secured to said rim at their outer ends extending inwardly on radial lines and having inner laterally enlarged arc shaped ends with abutting side surfaces in radial planes forming a continuous hub portion with a central opening, the upper and lower faces of said spokes at their ends being in planes parallel to the plane of the rim and the intermediate portions being at an angle to that plane, and means for securing the inner ends together.

10. A steering wheel comprising a continuous rim of wood curved in section, a plurality of wooden spokes secured to said rim at their outer ends extending inwardly on radial lines and having inner laterally enlarged arc-shaped ends with abutting side surfaces forming a continuous hub portion with a central opening and means for engaging and holding said inner ends in hub form and adapted to secure the wheel to a steering post.

11. A steering wheel composed entirely of wood comprising a continuous self-sustaining rim curved in cross section, a plurality of spokes of much greater width than thickness secured to said rim at their outer ends extending inwardly at an angle to the plane of the rim, and having inner ends enlarged on concentric circular lines with abutting surfaces in radial planes, mortices in the meeting faces of greater depth than width extending inwardly from the outer ends of the enlarged portions and wooden keys in said mortices securing said ends together their outer ends being flush with the outer surface of said enlarged portions.

12. A steering wheel comprising a rim, a plurality of wooden spokes the outer ends of the spokes being secured to the rim and the inner ends thereof being enlarged and provided with mortices in their adjacent portions having much greater depth than width and wooden keys inserted into the mortices to secure said inner ends together, the grain of the wood of the inserted keys lying circumferentially of said rim.

13. A steering wheel comprising a continuous self-sustaining rim rounded in cross section and adapted to be grasped by the hand of an operator, a plurality of wooden spokes secured to said rim at their outer ends extending inwardly on radial lines and having inner laterally enlarged arc-shaped ends with abutting side surfaces forming a continuous hub portion with a central opening means for engaging and holding said ends and adapted to secure the wheel to a steering post.

14. A steering wheel comprising a wheel, a plurality of wooden spokes the outer ends of the spokes being secured to the rim and the inner ends thereof being enlarged and provided with mortises in their adjacent portions and wooden keys inserted into the mortises to secure said inner ends together, the grain of the wood of the inserted keys lying circumferentially of said rim.

15. A steering wheel comprising a rim, four radial spokes having their outer ends secured to said rim and their inner ends enlarged and segmental in shape with radial abutting surfaces, the adjacent portions of said inner ends being mortised, and a radially disposed wooden key inserted into each pair of adjacent motises, the grain of each of said keys lying circumferentially of the hub, substantially as described.

16. The combination with a steering wheel having a wooden hub portion, of means for securing the same to a steering column comprising a sleeve adapted to fit over the steering column and to be fastened thereto and having an exterior annular flange lying on one side of the wooden hub, an annular ring member concentric with the sleeve and lying on the opposite side of the wooden hub, and means for moving the ring member to clamp the hub between the ring and flange and to hold the same in such position.

17. In combination with a steering wheel having a wooden hub portion, of means for securing the same to a steering column comprising a sleeve adapted to fit over the steering column and to be fastened thereon and having an exterior annular flange lying on one side of the wooden hub and an exterior threaded portion lying on the opposite side of the wooden hub, an annular ring member concentric to the sleeve and lying on the opposite side of the hub, and a clamping nut having threaded engagement with the threaded portion of the sleeve for moving the ring member toward the flange to clamp the hub therebetween and to hold the ring in such position.

18. The combination with a steering wheel having a wooden hub portion, of means for securing the same to a steering column comprising a sleeve adapted to fit over the steering column and to be fastened thereon and having an exterior annular flange lying on one side of the wooden hub, said flange having a plurality of radial projections on the side adjacent the hub, and movable means on the opposite side of the hub from the flange and connected to said sleeve, said means cooperating with the flange in clamping the hub and securing the same against rotation relative to the sleeve.

19. The combination with a steering wheel having a wooden hub portion, of means for securing the same to a steering column comprising a sleeve adapted to fit over the steering column and to be fastened thereon and having an exterior inner flange lying on one side of the wooden hub, an annular ring member concentric with the sleeve and lying from the opposite side of the wooden hub, said ring member having concentric annular projecting ridges on the side adjacent the hub, and means for moving the ring member toward the flange to clamp the hub therebetween and to hold the same in such position.

20. The combination with a steering wheel having a wooden hub portion provided with a plurality of recesses, of means for securing the same to a steering column comprising a sleeve adapted to fit over the steering column and to be fastened thereon and having an exterior annular flange lying on one side of the wooden hub, said flange having a plurality of pins extending into the recesses in said hub to prevent relative rotation of said sleeve and hub, and movable means connected to said hub and lying on the opposite side thereof from the flange for forcing said hub against said flange.

21. The combination with a steering wheel having a wooden hub portion, of means for securing the same to a steering hub comprising a sleeve adapted to fit over the steering hub and be fastened thereon and having an exterior annular flange lying on one side of the wooden hub, the surface of said flange adjacent the hub being provided with a plurality of radial projections and a plurality of pins extending into the recesses of said hub, and means connected to said sleeve for holding said hub against said flange.

22. The combination with a steering wheel having a steering hub portion, of means for securing the same to a steering column comprising a hub adapted to fit over the steering column and to be fastened thereon and having an exterior annular flange lying on one side of the wooden hub, said flange being provided with a plurality of projections on the surface adjacent the hub, and movable means connected to the sleeve for forcing said hub against said flange and holding the same in such position that the projections on the flange are mashed into the wooden hub whereby relative rotation of said hub and sleeve is prevented.

23. A steering wheel comprising a wooden rim, wooden spider arms having their outer ends connected with said rim, and their inner ends terminating in integral segments to produce a hub-receiving circular seat, wooden wedges inserted in slits formed at the adjoining edges of said segments, the grain of the wood of said wedges being disposed transversely of the grain of the wood of said arms.

In testimony whereof I affix my signature.

CHARLES H. KENRICK.